United States Patent [19]
Goodson

[11] Patent Number: 5,174,581
[45] Date of Patent: Dec. 29, 1992

[54] BIODEGRADABLE CLAY PIGEON

[76] Inventor: Deborah A. Goodson, 1438 Renegade Trail, Tallahassee, Fla. 32303

[21] Appl. No.: 820,921

[22] Filed: Jan. 15, 1992

[51] Int. Cl.⁵ .......................... F41J 9/16; A01K 5/00
[52] U.S. Cl. ................................ 273/363; 119/51.01; 119/51.03; 273/380; 426/805
[58] Field of Search ............... 273/362, 363, 364, 365, 273/380; 119/51.03, 57.8, 51.01; 426/805

[56] References Cited

U.S. PATENT DOCUMENTS

| | | | |
|---|---|---|---|
| 1,369,830 | 3/1921 | Mitchell | 273/363 |
| 1,791,175 | 2/1931 | Tomlinson | 119/51.03 X |
| 2,653,026 | 9/1953 | Feltus | 273/362 |
| 3,094,100 | 6/1963 | Wise | 119/51.03 |
| 3,122,129 | 2/1964 | Wise | 119/51.03 |
| 4,124,550 | 11/1978 | Kobayashi et al. | 273/362 X |
| 4,568,087 | 2/1986 | Schreiner-Hansen | 273/362 |
| 4,623,150 | 11/1986 | Moehlman et al. | 273/362 |
| 5,033,708 | 7/1991 | Brue et al. | 119/57.8 X |
| 5,034,227 | 7/1991 | Nickel | 426/634 X |

*Primary Examiner*—William H. Grieb
*Attorney, Agent, or Firm*—Richard C. Litman

[57] ABSTRACT

The instant invention is provides a biodegradable and edible clay pigeon. The pigeon is constructed in such a way to be stackable as well as to withstand the throwing force of the trap. A composition of sugar, birdseed and water is poured into a skeet mold and then dried. The resulting pigeon has been found to have a fragile structure which is both easily breakable by a shotgun blast as well as strong enough to withstand the throwing force of the trap. The pigeon is molded in such a manner to have an aerodynamic structure which permits the target to be projected with considerable speed into the air by the trap.

6 Claims, 1 Drawing Sheet

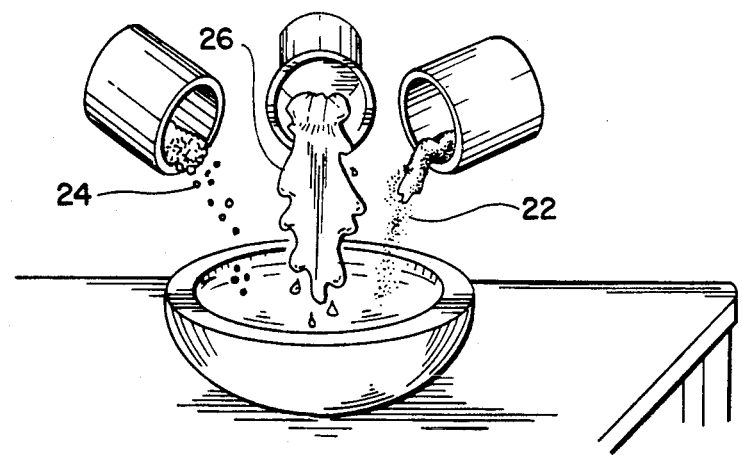
FIG. 1
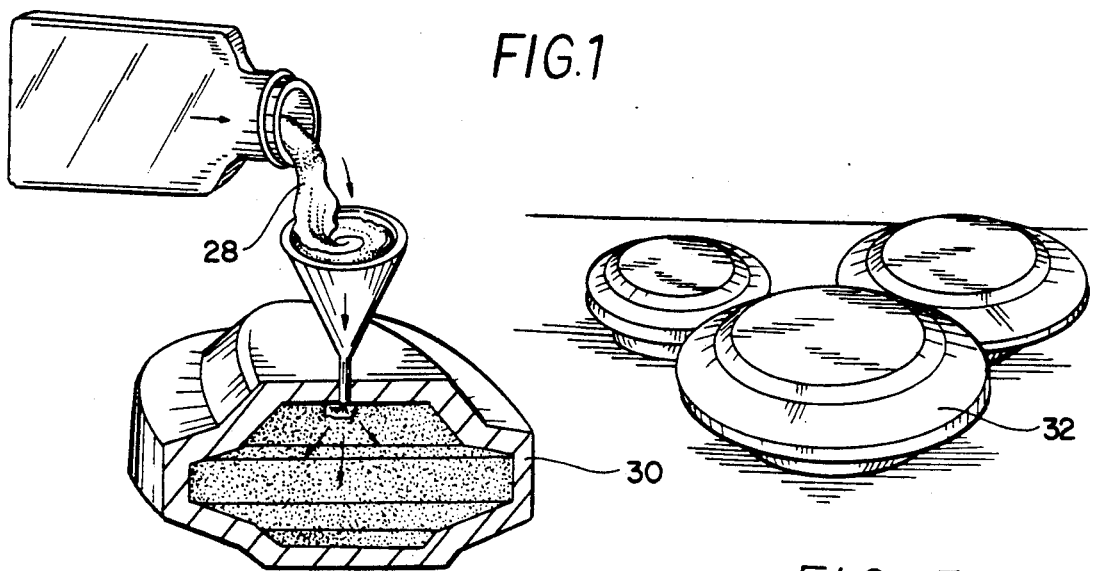
FIG. 2
FIG. 3
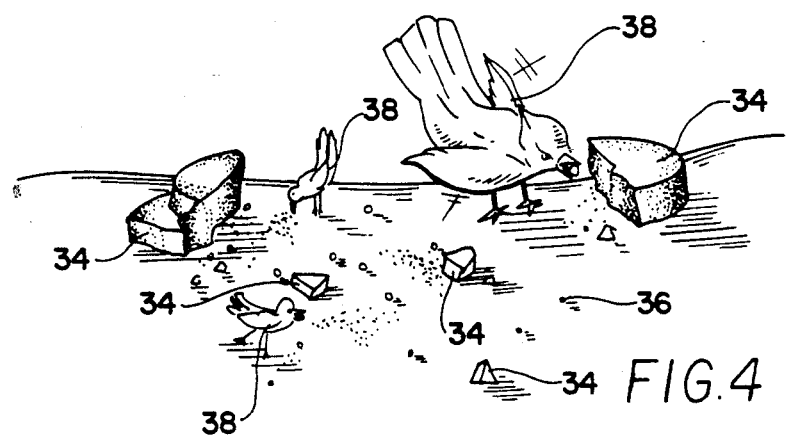
FIG. 4

BIODEGRADABLE CLAY PIGEON

FIELD OF THE INVENTION

The present invention relates to improvements in the composition of clay pigeons for use in trap or skeet shooting. More particularly the present invention relates to a clay pigeon composition which is completely biodegradable as well as edible.

DESCRIPTION OF THE PRIOR ART

Clay pigeons are known in art. U.S. Pat. No. 2,653,026 issued to Abram Feltus on Sep. 22, 1953 discloses an aerial target having a webbing surrounded by a standard petroleum based clay composition. The webbing may in time degrade.

U.S. Pat. No. 4,124,550 issued to Takashi Kabayashi et al. discloses a clay pigeon of different compositions. A table at the bottom of columns 5 and 6 discloses the various petroleum compositions and fillers. This illustrates the environmentally harmful compositions commonly utilized in clay pigeon construction.

U.S. Pat. No. 4,568,087 issued to Ib Schreiner Hansen on Nov. 7, 1978 discloses a non-toxic clay pigeon. The pigeon is composed of plaster, calcium carbonate, fly ash and heavy spar. Although non-toxic these materials are not particularly biodegradable and certainly are inedible.

U.S. Pat. No. 4,623,150 issued to V. C. Moehlman et al. on Nov. 18, 1986 discloses environmentally acceptable frangible target compositions. The targets are produced from inert components such as limestone and clay with a binder which is non-toxic. The composition is not particularly biodegradable or edible.

Clay pigeons in current use are not biodegradable and therefore cause concern to environmentalists.

None of the above referenced devices, considered either singly or in combination, is seen to suggest the instant invention as claimed.

SUMMARY OF THE INVENTION

Clay pigeons are targets which are generally saucer shaped. They are generally molded from a petroleum pitch combined with a particulate filler and a binder. These targets are intended to be destroyed by a marksman after being deployed by a mechanical disk throwing apparatus known as a trap. After being shattered by the marksman who scores a hit on the target, the pigeon residue falls to the range. The petroleum products do not degrade and are harmful to life and ecosystems.

The instant invention is drawn to an biodegradable and edible clay pigeon. The pigeon is constructed in such a way to be stackable as well as to withstand the throwing force of the trap. A composition of sugar, birdseed and water has been found to provide a fragile structure which is both easily breakable by a shotgun blast as well as strong enough to withstand the throwing force of the trap. The pigeon is molded in such a manner to have an aerodynamic structure which permits the target to be projected with considerable speed into the air by the trap. Once broken, the effects of precipitation dissolve away the sugar matrix leaving the bird seed to be eaten by the local fauna.

It is envisioned that other edible material such as grain or feed may be substituted for birdseed in the composition.

Accordingly, one object of the present invention is to provide a clay pigeon which is biodegradable into environmentally harmless substances.

Another object of the present invention is to provide a clay pigeon which is composed of substance such that they are edible by the local fauna.

Another object of the present invention is to provide a clay pigeon comprising sugar, birdseed and water.

Another object of the present invention is to provide a clay pigeon comprising sugar, water, and other granular non-water soluble edible materials.

Another object of the present invention is to provide a clay pigeon comprised of the above which withstands the throwing force of the skeet machine.

These and other objects of the present invention will become readily apparent upon further review of the following specification and drawings.

BRIEF DESCRIPTION OF THE DRAWINGS

FIG. 1 is a perspective view showing the composition being mixed;

FIG. 2 is a perspective view of the composition being placed in the mold, as well as a partial cross section of the interior of the mold;

FIG. 3 is a perspective view of the finished biodegradable pigeons; and

FIG. 4 is an environmental perspective view of the instant invention after being hit by a marksman, being eaten by the local fauna.

Similar reference characters denote corresponding features consistently throughout the attached drawings.

DETAILED DESCRIPTION OF THE PREFERRED EMBODIMENT

The present invention is drawn to the composition of a clay pigeon 32 for skeet and trap shooting. In this case, the term clay pigeon is used to indicate the saucer shaped target which is thrown by a trap during the sport of skeet shooting. Referring now to the drawings, sugar 22 and birdseed 24 are mixed with water 26. Other non-water soluble edible substances, such as legumes oatmeal, may be substituted for the birdseed 24. These ingredients are generally known and are commercially available. FIG. 1 represents the combining of the above materials which forms the mixture 28 which will be poured into the skeet mold 30. The combination is heated until it forms a syrupy mixture 28 which is somewhat viscous. The mixture 28 is then poured into the skeet mold 30 as shown in FIG. 2. This mixture 28 is then cooled resulting in a crystalline matrix of sugar enveloping a lattice of birdseed (Or other edible substance) in the form of a clay pigeon 32. Common food coloring may be added to the mixture 28 to give the clay pigeons 32 a variety of colors. Food coloring is not harmful to the environment or upon ingestion.

These pigeons 32 are designed to be stacked and transported while retaining their structural integrity. The pigeons 32 of this composition are also able to withstand the throwing force of the trap mechanism, while retaining their aerodynamic structure. The pigeon targets 32 are designed to shatter into fragments when hit by a marksman, thus satisfying the victory conditions of the sport of skeet shooting.

Referring now to FIG. 4, the shattered clay pigeon 34 is shown scattered on the range. As a result of the blast, some of the birdseed 36 or other edible substance will have broken free from the crystalline sugar matrix. Sugar being water soluble will dissolve during normal precipitation thus freeing the birdseed 36 from the sugar matrix. This leaves the seeds 36 in a state which would permit their consumption by the local fauna 38. As a result of the rains, the sugar will dissolve and be carried away with the water. The solid crystalline sugar may also be consumed prior to it being dissolved by precipitation. Thus, the instant invention provides a clay pigeon which is both biodegradable and edible, and does not have the negative envirnomental consequences of petroleum based or other non-biodegradable pigeons.

One embodiment of the pigeons of the instant invention are made by heating two parts water with one part sugar until the mix is boiling. Then two parts birdseed is added and the mix is brought to boiling again. This is then cooled slightly and poured into a marble skeet mold. When the mixture cools in about one hour, the pigeon is removed from the mold. The ratio of ingredients are general and can be varied to still produce an acceptable pigeon.

It is to be understood that the present invention is not limited to the sole embodiment described above, but encompasses any and all embodiments within the scope of the following claims.

I claim:

1. A biodegradable frangible flying target comprising a matrix formed from crystallized sugar which envelopes a plurality of substantially granular edible elements, said flying target having an aerodynamic structure, and constructed to retain its integral configuration when thrown by a trap mechanism.

2. A target as claimed in claim 1 wherein said edible elements are comprised of birdseed.

3. A target as claimed in claim 1 wherein said edible elements are comprised of legumes.

4. A target as claimed in claim 1 wherein said edible elements are comprised of oatmeal.

5. A target as claimed in claim 1 where the volume of said crystallized sugar is about one half that of the volume of said edible elements.

6. A biodegradable frangible flying target comprising a matrix formed from crystallized sugar which envelopes a plurality of substantially granular edible elements, said matrix being saucer shaped, said target being constructed to retain its integral configuration when thrown by a trap mechanism.

* * * * *